(12) United States Patent
Guertler et al.

(10) Patent No.: US 9,937,088 B2
(45) Date of Patent: Apr. 10, 2018

(54) AUTOMOTIVE WHEELCHAIR STORAGE DEVICE

(71) Applicant: Store-Easy, LLC, St. Louis, MO (US)

(72) Inventors: Charlotte Guertler, St. Louis, MO (US); Alaric D'Souza, St. Louis, MO (US); Rachel Milgrom, St. Louis, MO (US); Thomas Hong, Pleasanton, CA (US); Yu Xiao, St. Louis, MO (US); Sam Nadell, Rye Brook, NY (US)

(73) Assignee: Store-Easy, LLC, St. Louis, MO (US)

( * ) Notice: Subject to any disclaimer, the term of this patent is extended or adjusted under 35 U.S.C. 154(b) by 154 days.

(21) Appl. No.: 15/142,716

(22) Filed: Apr. 29, 2016

(65) Prior Publication Data
US 2016/0346141 A1    Dec. 1, 2016

Related U.S. Application Data

(60) Provisional application No. 62/155,247, filed on Apr. 30, 2015.

(51) Int. Cl.
| | |
|---|---|
| *A61G 3/08* | (2006.01) |
| *B60R 9/042* | (2006.01) |
| *A61G 3/02* | (2006.01) |
| *A61G 3/06* | (2006.01) |

(52) U.S. Cl.
CPC ......... *A61G 3/0808* (2013.01); *A61G 3/0209* (2013.01); *B60R 9/0426* (2013.01); *A61G 3/062* (2013.01)

(58) Field of Classification Search
CPC .... A61G 3/0808; A61G 3/0209; A61G 3/026; B60R 9/0426

USPC ................................ 414/462, 465, 466
See application file for complete search history.

(56) References Cited

U.S. PATENT DOCUMENTS

| | | | | | |
|---|---|---|---|---|---|
| 4,134,509 | A | * | 1/1979 | Clement | B60R 9/0426 224/310 |
| 4,236,860 | A | * | 12/1980 | Gottlieb | A61G 3/0209 414/462 |
| 4,272,218 | A | * | 6/1981 | Carter | B60R 9/0426 224/310 |
| 4,440,540 | A | * | 4/1984 | Gottlieb | A61G 3/0209 414/462 |
| 4,484,851 | A | * | 11/1984 | Gottlieb | A61G 3/0209 414/462 |
| 4,544,321 | A | * | 10/1985 | Lanier | A61G 3/0209 212/350 |

(Continued)

OTHER PUBLICATIONS https://www.etrailer.com/Hitch-Cargo-Carrier/Rage-Powersports/SC500-AL105.html, Nov. 29, 2016.

*Primary Examiner* — Kaitlin S Joerger
(74) *Attorney, Agent, or Firm* — Husch Blackwell LLP

(57) ABSTRACT

An automatic device for storing wheelchairs behind vehicles is provided. The wheelchair storage device is configured to mount to the exterior of a vehicle on the vehicle's roof rack. The storage device includes a horizontal and vertical arm, that when activated by a motor, uses a series of motors and gears to move a wheelchair attached to the vertical arm to the rear of the vehicle. A storage platform is further provided that receives and secures the wheelchair behind the vehicle. The motors of the storage device may be powered by the vehicle's engine, and a remote may be provided for user control.

20 Claims, 8 Drawing Sheets

(56) References Cited

U.S. PATENT DOCUMENTS

| | | | | |
|---|---|---|---|---|
| 5,205,700 A * | 4/1993 | Lin | ............... | A61G 3/0209 |
| | | | | 414/540 |
| 5,746,563 A * | 5/1998 | Steckler | ............... | A61G 3/0209 |
| | | | | 414/462 |
| 5,827,036 A * | 10/1998 | Steffes | ............... | A61G 3/0209 |
| | | | | 224/310 |
| 6,007,289 A * | 12/1999 | Kruse | ............... | A61G 3/0209 |
| | | | | 414/462 |
| 6,273,668 B1 * | 8/2001 | Kameda | ............... | A61G 3/0209 |
| | | | | 224/321 |
| 7,374,388 B2 * | 5/2008 | Holt | ............... | B60P 1/5471 |
| | | | | 212/180 |
| 7,377,740 B2 | 5/2008 | Panzarella | | |
| 8,540,474 B2 * | 9/2013 | Egan | ............... | A61G 7/1001 |
| | | | | 212/230 |
| 2004/0028510 A1 | 2/2004 | Jones | | |
| 2006/0182569 A1 * | 8/2006 | Andersson | ............... | B60R 9/0426 |
| | | | | 414/462 |
| 2014/0169918 A1 * | 6/2014 | Buller | ............... | B60R 9/042 |
| | | | | 414/462 |

\* cited by examiner

AUTOMOTIVE WHEELCHAIR STORAGE DEVICE

CROSS-REFERENCE TO RELATED APPLICATIONS

This application claims the benefit of U.S. Provisional Application No. 62/155,247, filed Apr. 30, 2015, which is hereby incorporated by reference in its entirety.

BACKGROUND OF THE INVENTION

There are currently several devices available on the market for the transfer and storage of manual wheelchairs in an automobile. These systems are difficult for wheelchair users to use or operate as they enter or exit a vehicle. There are approximately 1.5 million manual wheelchair users in the United States, and of those, 70% are at one time or another injured when they transfer from their wheelchair to an automobile. These injuries are typically overuse injuries, and the resulting damage could cause a manual wheelchair user to prematurely switch to an automated wheelchair.

Some wheelchair users simply disassemble their wheelchairs before entering their vehicles and reassemble the wheelchair when they reach their destination. The process of a wheelchair user transferring from the wheelchair seat to a vehicle seat, disassembling the wheelchair, and hoisting it into the vehicle is an arduous one that often results in injury.

Of the products currently available on the market for storing a manual wheelchair during transit, the majority of systems are crane-based and semi-automated. The systems can be mounted on the interior or exterior of the automobile. For those systems, manual assistance is often first required to attach such systems to the wheelchair. A manual control is then used to activate and automate the lift function, sometimes requiring additional manual effort to guide the chair safely into the vehicle. If not in combination with a second system or piece of equipment, these systems may require the driver to possess a level of independence and functional mobility necessary to return to the driver's seat after their chair is stored all by themselves. Besides being limited to use by individuals having greater ambulatory capabilities, the use of these systems are often restricted to particular types of vehicles with sufficient storage space. Moreover, having ample storage space often limits seating for other passengers.

Another system variation is storing a manual wheelchair in a rooftop carrier. This system also requires manual assistance for attachment, but the manual control performs both the lift and storage function with no additional effort. With storage on the rooftop, this system may be compatible with a wider range of automobiles including a standard sedan-type. However, it poses safety risks when driving under a bridge or overpass. Also, use with rigid frame manual wheelchairs is not possible as the system requires folding of the wheelchair for storage in a more compact rooftop carrier to limit wind resistance. Moreover, non-rigid manual wheelchairs can be problematic because they often fail to provide adequate back and/or seat support for wheelchair users.

In yet another existing system, wheelchair users may store their wheelchairs in the bed of a pickup truck when in transit. This system also requires manual assistance for attachment, and a vehicle lift may be used to lift the wheelchair into the truck bed. However, because truck seats of a cab are typically elevated, a modified truck must be used with this system.

SUMMARY OF THE PRESENT INVENTION

A wheelchair storage device is provided for securing and storing a wheelchair at a rear portion of a vehicle while a wheelchair user is in transit in the vehicle. In a preferred embodiment, the storage device is attached to the vehicle by an adapter plate that is selectively attachable to a roof rack of the vehicle. The adapter plate includes a track member extending along its length.

A control panel may also be attached to the adapter plate. An arm member is also attached to the control panel. The arm member is a horizontal arm portion extending from the control panel to a vertical arm portion. The vertical arm portion extends downwardly from the horizontal arm portion. An attachment member is attached to a lower portion of the vertical arm portion for selectively engaging the wheelchair.

The control panel includes each of a first, second, and third motor. The first motor is in mechanical connection with the vertical arm portion by way of the horizontal arm portion, in a preferred embodiment by a cord member which extends through each of the arm portions. The second motor includes a gear assembly connected to the horizontal arm. The third motor housed in said control panel includes a gear assembly engaged with the track member by way of a gearing mechanism.

When the attachment member is selectively engaged with the wheelchair and the first motor is activated, the vertical arm portion is pulled upwardly and the wheelchair is lifted off of the ground. When the second motor is activated, the horizontal arm portion and the wheelchair connected to the vertical arm portion are rotated rearwardly toward the rear portion of the vehicle. Lastly, when the third motor is activated, the horizontal member and the wheelchair are translated rearwardly toward the rear portion of the vehicle via the track member. The third motor may be activated either concurrently with the second motor, or before the second motor.

In at least one embodiment, the wheelchair storage device includes a storage platform for stowing the wheelchair when the vehicle is in motion. In that embodiment, the storage platform includes a locking device for securing the wheelchair within the storage platform while the vehicle is in motion.

In another embodiment, the wheelchair storage device is in communication with a power source of the vehicle for providing power to the wheelchair storage device, for example the vehicle's battery.

The control panel may include a computer device having software for programming operations of the wheelchair storage device.

In one embodiment, the attachment member includes hook members for receiving and securing wheels of the wheelchair.

In yet another implementation of the invention, the vertical arm portion is selectively extendable and retractable. A cord member may also be provided through the first arm portion and the second arm portion in connection at a first end with the attachment mechanism and at a second end with the first motor such that when the first motor is activated the wheelchair is lifted vertically upwards. Other structures for moving the arm member and its portions are also envisioned.

Preferably, the adapter plate is selectively engageable with a rack member of any type of vehicle.

Also in a preferred embodiment, the first, second, and third motors are operable using a remote control. In other embodiments, a wireless connection such as a Bluetooth connection may be utilized.

BRIEF DESCRIPTION OF THE DRAWINGS

In the accompanying drawings, which form a part of the specification and are to be read in conjunction therewith in which like reference numerals are used to indicate like or similar parts in the various views.

DETAILED DESCRIPTION OF THE INVENTION

The present invention provides an automatic device and method for storing a wheelchair behind a vehicle while a wheelchair user is in transit. The device allows a wheelchair user to exert low effort stowing the wheelchair while in transit because the storage device is automatically controlled.

Figure 1:
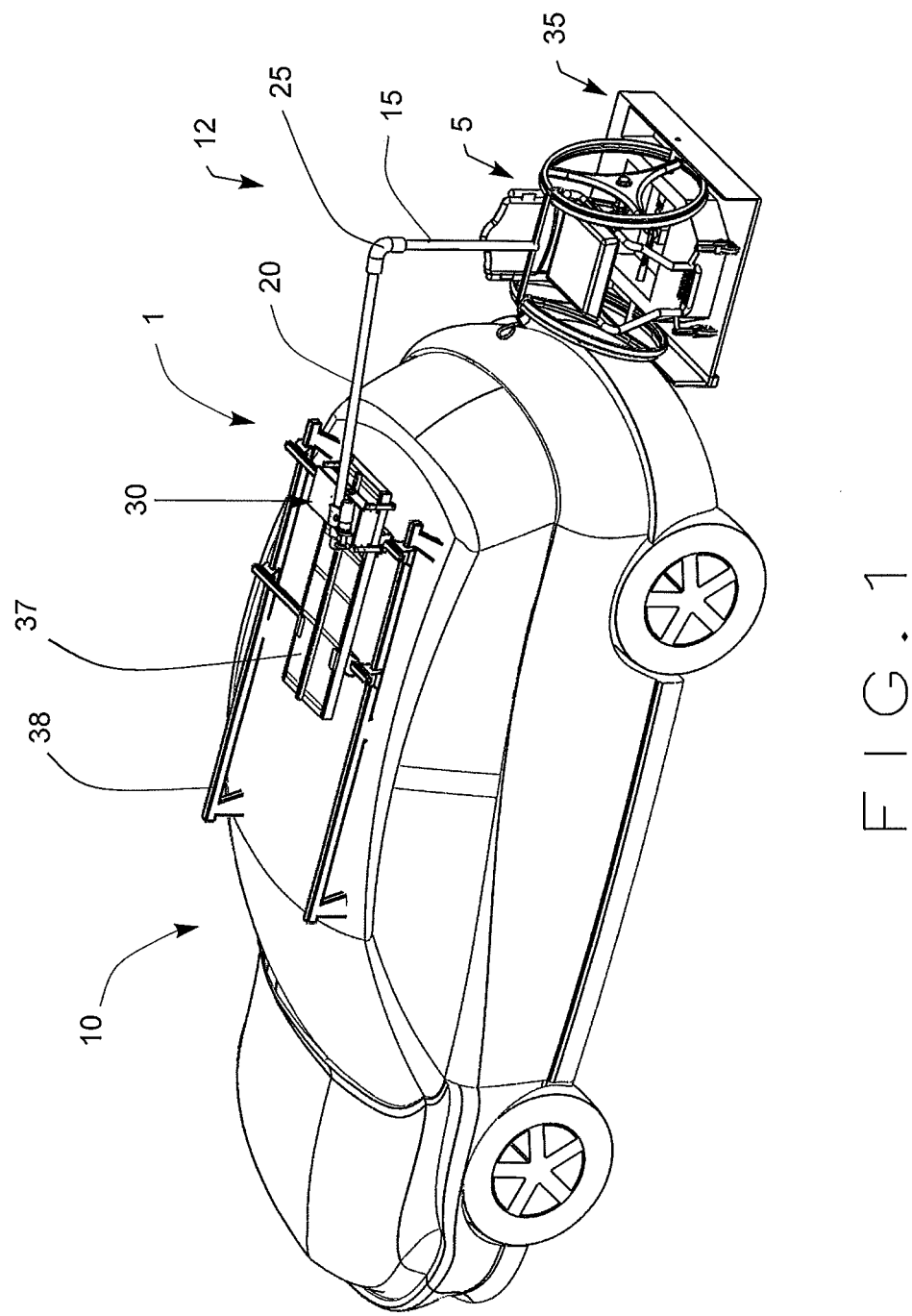
FIG. 1 is a perspective view of a wheelchair attached to an automatic wheelchair storage device subject to the teachings of the present invention, wherein the wheelchair is stowed and secured at the rear of a vehicle.

FIG. 1 illustrates wheelchair storage device 1 when a wheelchair 5 has been secured and stowed behind a vehicle 10. With wheelchair 5 positioned behind vehicle 10, wheelchair 5 is out of the way of traffic. By positioning wheelchair 5 behind vehicle 10 rather than on top of the roof of vehicle 10, vehicle 10 will not face clearance issues when going under a bridge or overpass. Storage device 1 includes an arm member 12 having each of a first telescoping arm portion (or arm member) 15 and a second arm portion (or arm member) 20. The arm portions 15, 20 are connected at an elbow joint 25. Arm member 12 and its arm portions 15, 20 are preferably made of metal, but in alternative embodiments, may be made of any material that is light, strong, and rigid. Arm members 15, 20 are operable by way of a control panel 30 and associated mechanisms. Control panel 30 is preferably attached to an adapter plate 37 which is selectively attachable to a roof rack 38 of vehicle 10. Wheelchair 5 is securable to storage platform 35 as in the embodiment illustrated in FIG. 1. Storage platform 35 is preferably made of plastic, but it can be made of any sturdy and rigid material such as a light metal like aluminum.

A roof rack 38 is shown in FIG. 1. Roof rack 38 may be a roof rack pre-installed on a vehicle, or alternatively, it may be a roof rack that is purchased after-market. Control panel 30, adapter plate 37, roof rack 38, and various components thereof are shown in in FIGS. 7 and 8 in greater detail, and are discussed in greater detail herein below. The specific manner in which storage device 1 operates to move wheelchair 5 from its first position near the driver's door to the rear of vehicle 10 will also be explained in greater detail herein below.

Figure 3:
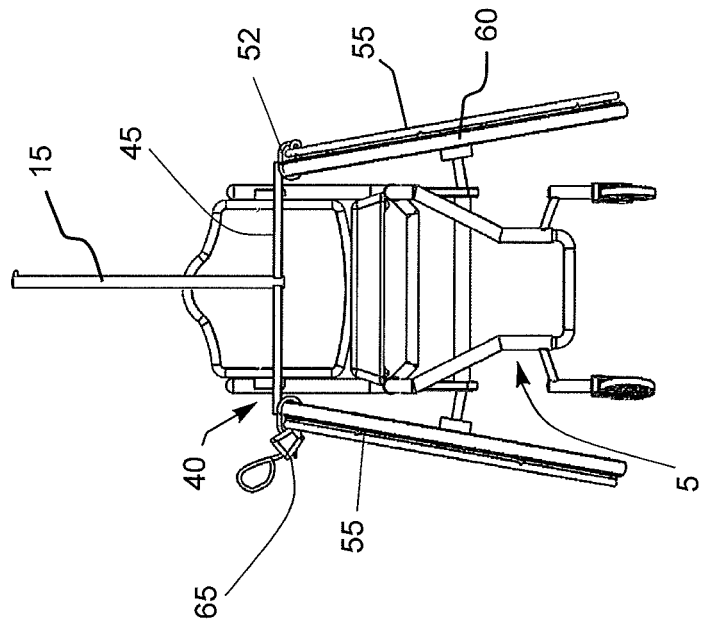
FIG. 3 is an elevation view of the hook mechanism of FIG. 2, wherein the hook mechanism has received and secured the wheelchair of FIG. 1.
Figure 2:
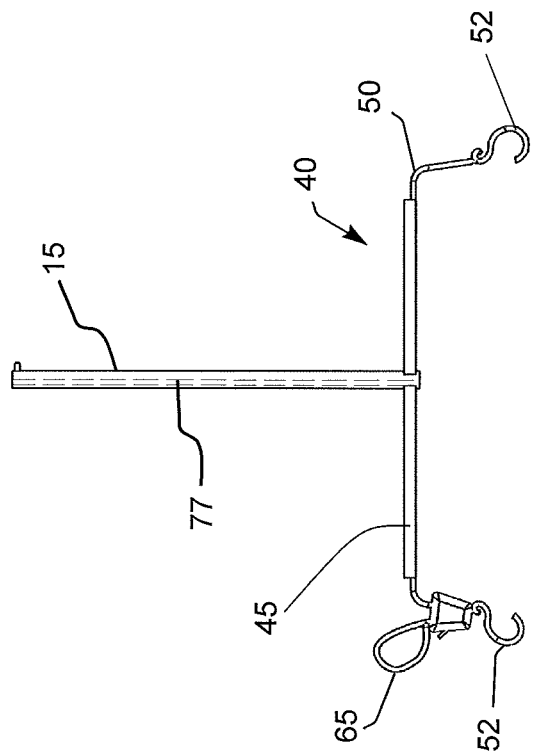
FIG. 2 is an elevation view of a hook mechanism of the automatic wheelchair storage device, wherein the hook mechanism is in position to receive and secure a wheelchair.

FIG. 2 illustrates an attachment member 40 for securing wheelchair 5 to storage device 1. Attachment member 40 is preferably attached to arm member 15 by way of crossbar 45 of attachment member 40. In the embodiment illustrated in FIG. 2, crossbar 45 is hollow such that a cord member 50 may pass through crossbar 45. Cord member 50 preferably includes hook members 52 attached to its end portions. In other embodiments, attachment means such as Velcro straps, snap members, clamp devices, or other foreseeable means may be used in lieu of hook members 52. Hook members 52 are preferably selectively attachable to rim portions 55 of wheels 60 of wheelchair 5, as shown in FIG. 3. FIG. 3 illustrates attachment member 40 when it has received and engaged wheels 60 of wheelchair 5.

In a preferred embodiment, at least one hook member 50 includes a locking feature 65 that allows cord member 45 to be tightened to reduce play in cord member 45. When pulled tightly, locking feature 65 preferably also presses crossbar 45 to the arms and/or or wheels 60 of wheelchair 5, thus providing a rigid connection there between. In the illustrated embodiment, locking feature 65 is a ratcheting device known and understood in the art, but in alternative embodiments, locking feature 65 may be a cinching device or other known or foreseeable means for tightening cord member 45. Locking feature 65 is preferably looped as shown in FIG. 2 so that individuals with limited fine motor use could place their hand and/or arm through the loop and easily operate locking feature 65. Preferably locking feature 65 also includes a large lever so locking feature 65 is easily loosened.

In alternative embodiments where the wheelchair being stored is not a manual wheelchair such as wheelchair 5, other attachment members may be utilized for selective attachment with an electric wheelchair, scooter, or other assist device known or foreseeable in the art. In those alternative embodiments, the attachment member should be able to securely engage the assist device while it moves from the front of the vehicle to the rear, and while the vehicle is in motion. It also should be selectively attachable to arm member 15 by some known or foreseeable attachment means.

Figure 4:
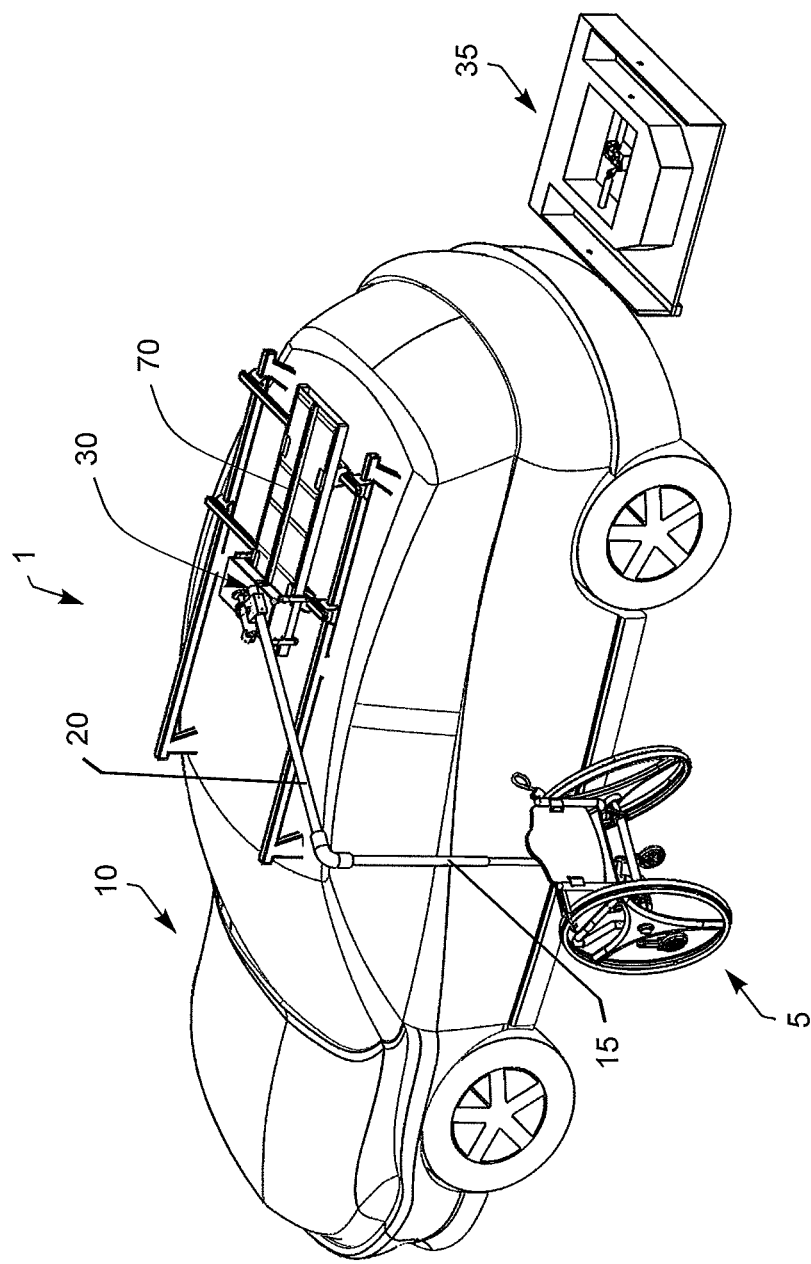
FIG. 4 is a perspective view of the wheelchair attached to the automatic wheelchair storage device of FIG. 1, wherein the wheelchair is at a front side portion of the vehicle.

FIG. 4 illustrates storage device 1 in a first position where wheelchair 5 is positioned next to vehicle 10 near the driver's door. In another embodiment, wheelchair device 1 may be positioned in a substantially mirror-image arrangement relative to the arrangement shown in FIG. 4. In that arrangement, wheelchair 5 is positioned on the passenger side of vehicle 10, as are arm members 15, 20.

Figure 5:
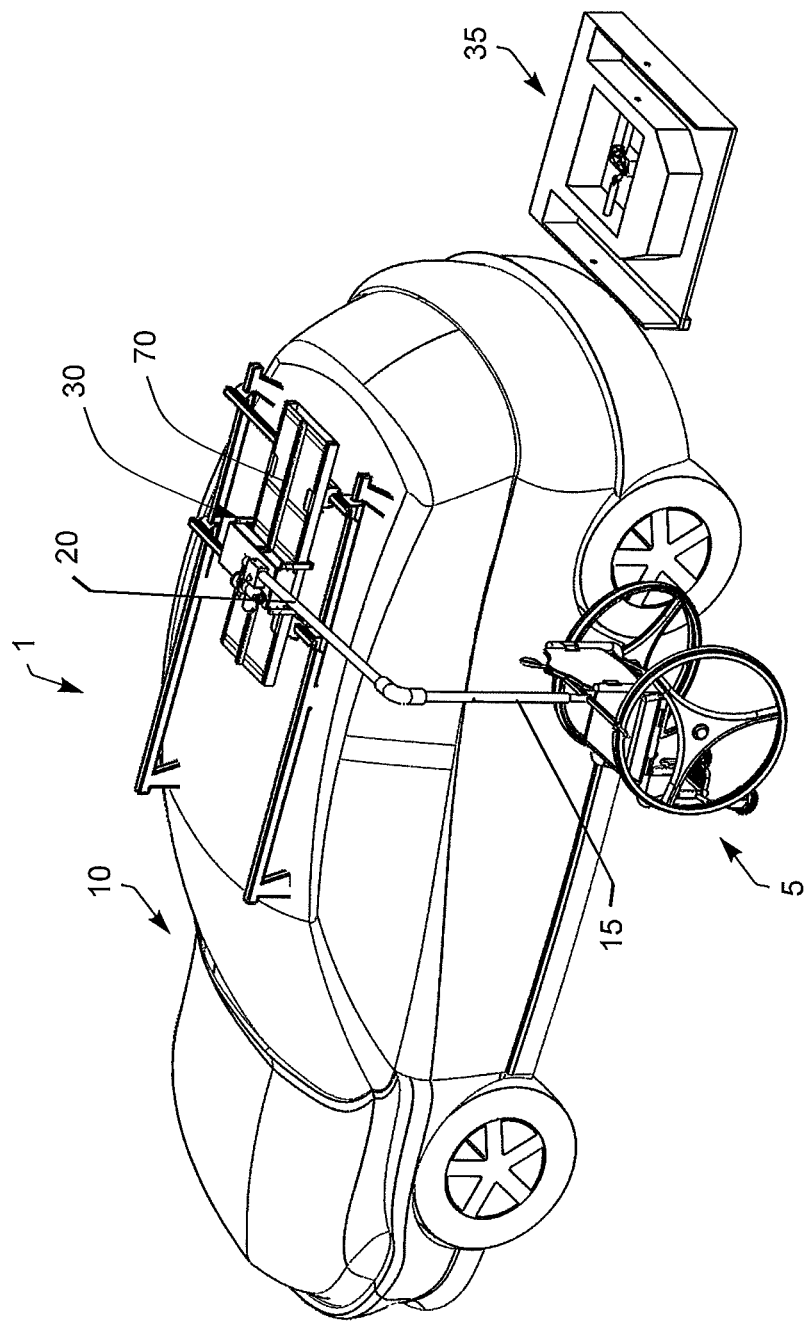
FIG. 5 is a perspective view of the wheelchair attached to the automatic wheelchair storage device of FIGS. 1 and 4, wherein the wheelchair is at a rear side portion of the vehicle.

FIG. 5 illustrates wheelchair 5 in a position at the rear of vehicle 10, but still on the side of vehicle 10. As shown, control panel 30 has similarly translated along track member 70 to the rear of vehicle 10. At the same time, second arm member 20 has rotated outwardly away from the driver door of vehicle 10 such that it is substantially perpendicular to vehicle 10. Because wheelchair 5 is already preferably raised off of the ground, as set forth above, wheelchair 5 should be substantially prevented from brushing against uneven ground or other obstacles as it moves and rotates rearwardly.

This rotation of arm member 20 away from vehicle 10 is substantially circular, as will be described herein below when describing components of control panel 30. In an alternative embodiment, as arm member 20 rotates, it may also telescope inwardly or outwardly, depending on the size and shape of vehicle 10.

Figure 6:
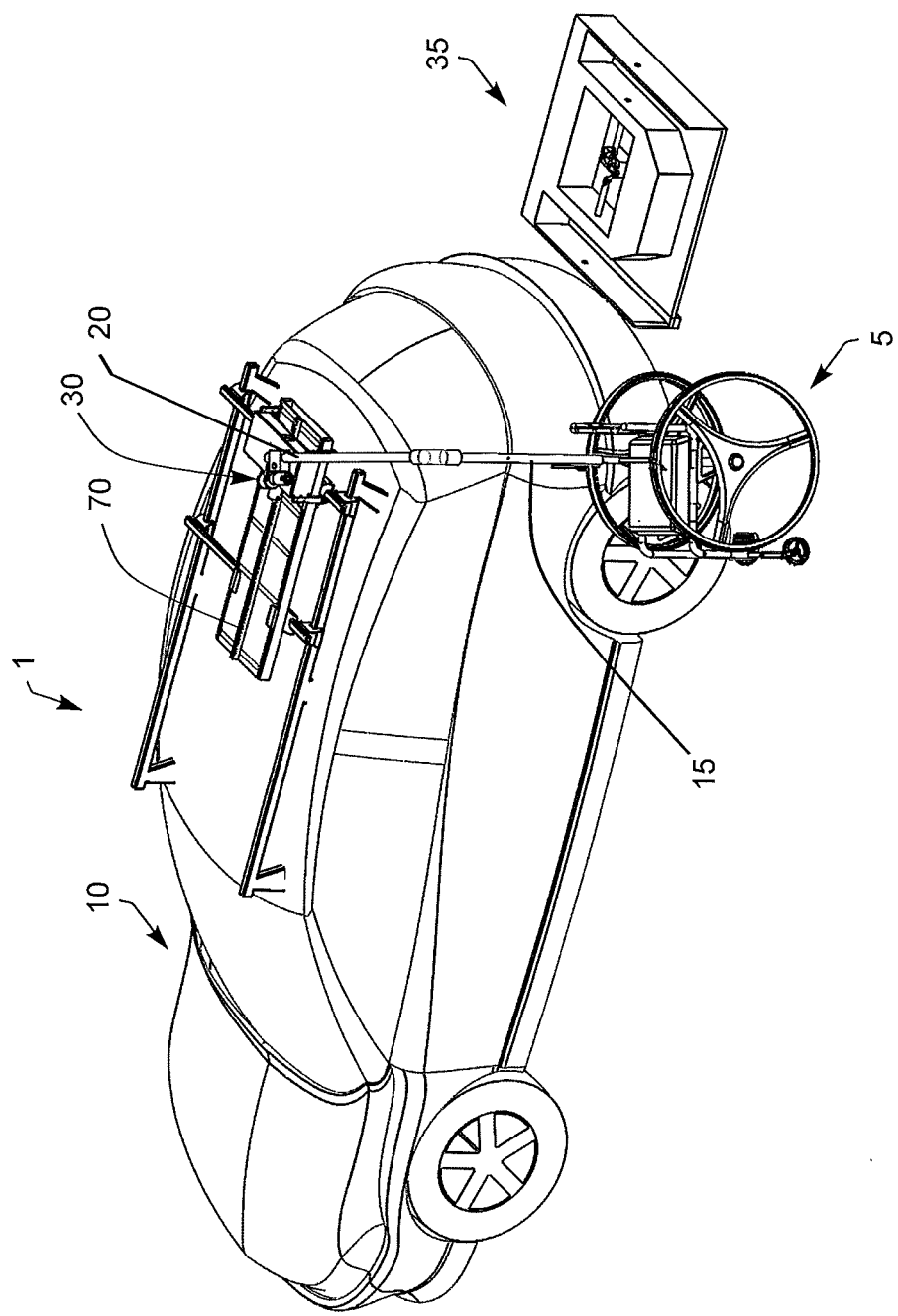
FIG. 6 is a perspective view of the wheelchair attached to the automatic wheelchair storage device of FIGS. 1, 4, and 5, wherein the wheelchair is at a rear portion of the vehicle.

FIG. 6 illustrates wheelchair 5 in a position at the rear of vehicle 10, substantially behind the bumper of vehicle 10. As shown in FIG. 6, control panel 30 and arm member 20 have translated to the rear of track member 70 at this position, and arm member 20 has rotated further outwardly away from the driver door of vehicle 10 such that it is approaching being parallel to vehicle 10. As described above, in an alternative embodiment, as arm member 20 rotates outwardly, it may also telescope inwardly, depending on the size and shape of vehicle 10.

In the position illustrated in FIG. 6, wheelchair 5 is in position to be received and engaged by storage platform 35. Storage platform 35 and its method and mechanism for receiving and engaging wheels 60 of wheelchair 5 are described below and shown in FIGS. 9 and 10.

Figure 7:
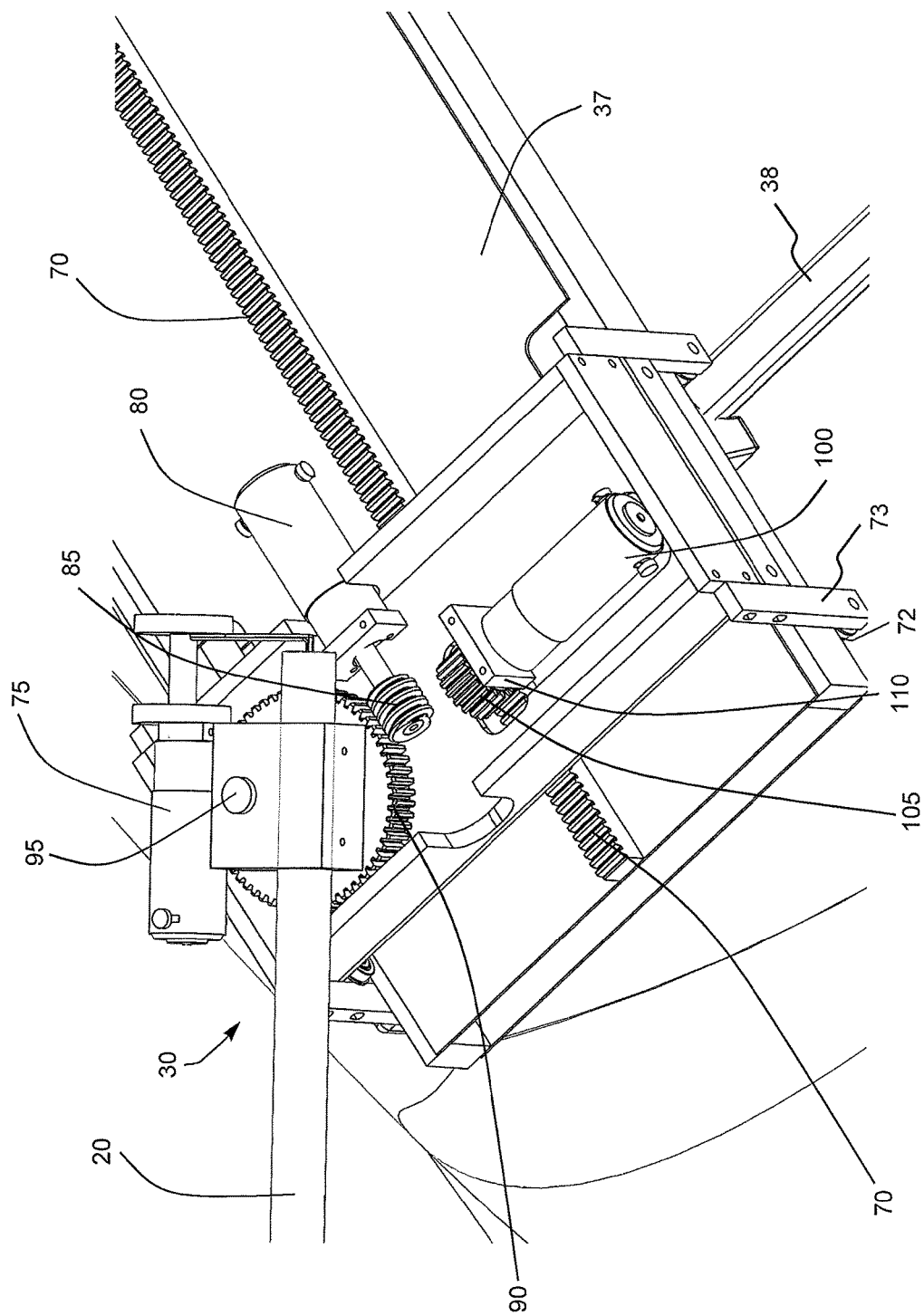
FIG. 7 is an enlarged perspective view of a control panel of the automatic wheelchair storage device of FIGS. 1 and 4-6.
Figure 8:
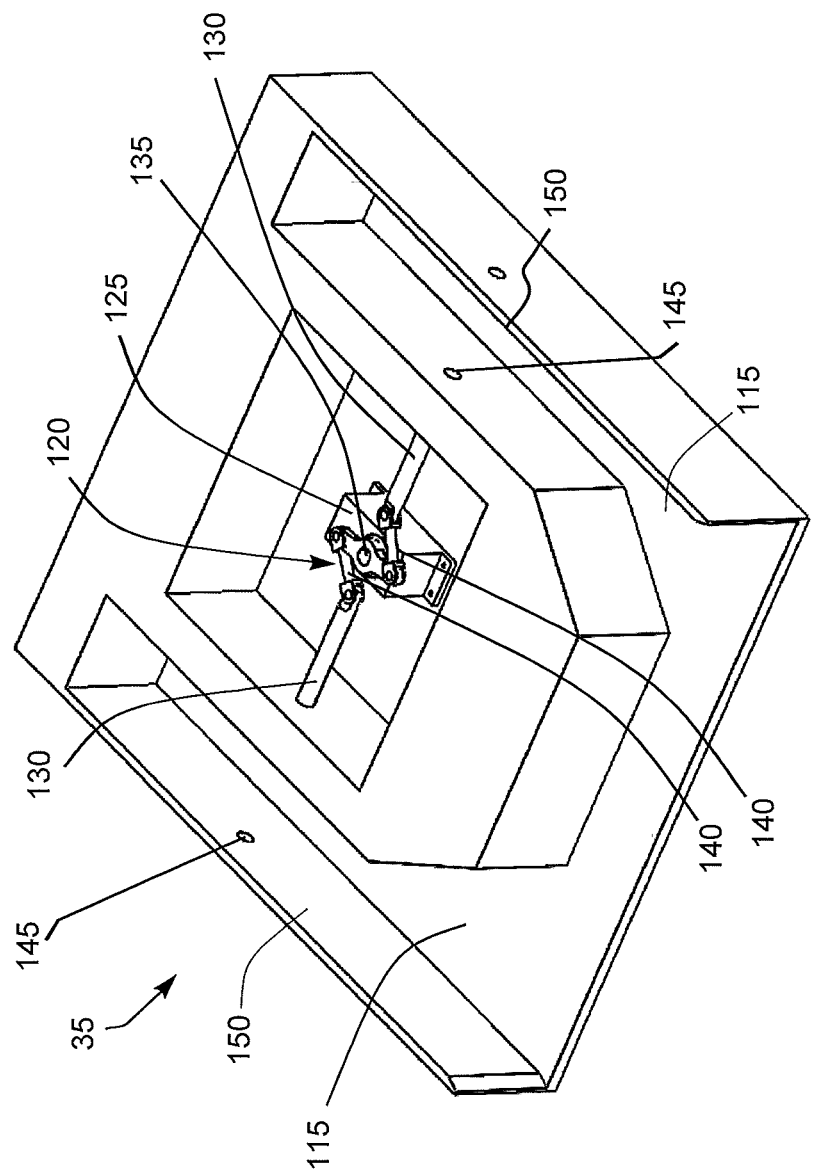
FIG. 8 is a perspective view of a storage platform of the automatic wheelchair storage device, wherein a lock mechanism associated with the storage platform is in position to receive and secure the wheelchair.

FIG. 7 illustrates the interior of control panel 30 in greater detail. Control panel 30 may contain various gears and other components for facilitating the movement of wheelchair 5 from a driver or other automobile or vehicle seat to a rear, stowed position. As shown in FIGS. 7 and 8, and described above, control panel 30 is preferably movably mounted on adapter plate 3. Adapter plate 37 may be mounted on roof rack 38 in a manner known or foreseeable in to those skilled in the art (e.g., snap-fit, bracketing). In the illustrated embodiment, rollers 72 and brackets 73 are used to attach adapter plate 37 to roof rack 38. Rollers 72 preferably allow adapter plate 37 to slide along roof rack 38 as wheelchair 5 is translated to the rear of vehicle 10 in the manner described below. In the embodiment illustrated in FIGS. 7 and 8, storage device 1 is in its "stowed" position, where wheelchair 5 is secured behind vehicle 10 in storage platform 35.

FIG. 7 illustrates a first motor 75 attached to both of control panel 30 and arm member 20. When a wheelchair user has effectively moved from a wheelchair to a seat in vehicle 10, and attached wheelchair 5 to attachment member 40 as set forth above, he or she may be ready to move wheelchair 5 so that it is stored behind vehicle 10. To do so, first motor 75 first lifts wheelchair 5 off of the ground by raising telescopic arm member 15. Arm member 12 and its portions 15, 20 are preferably sufficiently hollow to allow a cable member 77 (a portion of which is illustrated in FIG. 2) to run through arm member 12. The cable member running through arm member portions 15, 20 is preferably connected to first motor 75 at one end, and with crossbar 45 at its other end. In lieu of a cable member, in some embodiments a chain member or a rope member may run through arm member 12 and be used to raise wheelchair 5 off of the ground. Other mechanisms for doing the same are also envisioned.

When first motor 75 is activated, the cable member is retracted such that it is pulled upwardly, and attachment member 40 attached to wheelchair 5 via crossbar 45 is also pulled upwardly. When cable member is pulled upwardly, arm member 15 is preferably telescoped within itself by any known or foreseeable mechanical method such as electromagnetic or mechanical telescoping. After motor 75 has been pulled upwardly such that wheelchair 5 attached to crossbar 45 is also pulled upwardly, storage device 1 and wheelchair 5 may be in the position illustrated in FIG. 4.

Control panel 30 also preferably includes a second motor 80 that preferably includes a driving gear 85 connected thereto. When driving gear 85 is activated via motor 80, driving gear 85 preferably engages a circular reduction gear 90 engaged with driving gear 85. Reduction gear 90 is preferably attached to arm member 20 via a hinge pin 95 which drives through a receptacle for storing electronic components thereof. When reduction gear 90 is engaged by driving gear 85, it is rotated counterclockwise in a manner known to those skilled in the art. As gear 90 rotates in a counterclockwise direction, so too does arm member 20, which is attached to wheelchair 5 via attachment member 40. As arm member 20 rotates outwardly toward the rear of vehicle 10, wheelchair 5 is also preferably rotated toward the rear of vehicle 10. Arm member 20 and wheelchair 5 are shown as progressively rotated outwardly away from the center of vehicle 10 in FIGS. 5 and 6.

In an alternative embodiment where device 1 is placed on the passenger side of a vehicle such as vehicle 10, motor 80 and driving gear 85 may be placed on the other side of reduction gear 90 such that reduction gear 90 is rotated in a clockwise direction, thus still allowing arm member 20 and wheelchair associated therewith to rotate away from the center of vehicle 10 and toward the rear of vehicle 10.

At the same time motor 80 operates to rotate wheelchair 5 toward the rear of the vehicle, a third motor 100 having a driving gear 105 attached thereto may be used to translate arm member 20, arm member 15, and wheelchair 5 linearly toward the rear of vehicle 10. When motor 100 is activated, driving gear 105 preferably engages track member 70, which acts as a reduction gear. As motor 100 is operated, driving gear 105 rotates along track member 70 in a gearing fashion toward the rear of vehicle 10.

Third motor 100 is preferably engaged with control panel 30 at a bracket portion 110 thereof. That way, when third motor 100 is activated and driving gear 105 rotates along track member 70 along the length of adapter plate 37, control panel 30 attached to arm member 20 is likewise translated along the length of adapter plate 37. Along with arm member 20, wheelchair 5, which is attached thereto, is also moved rearwardly toward the rear of vehicle 10. In a manner substantially similar to the manner described above for motor 80, if the device 1 is set up for use on the passenger side of vehicle 1, motor 100 may be placed on the other side of track member 70 so that arm member 20 is still translatable to the rear of vehicle 10 on the passenger side of vehicle 10. FIG. 5 illustrates storage device 1 in a position where wheelchair 5 is substantially located at a rear side portion of vehicle 10, and FIG. 6 illustrates wheelchair 5 substantially behind vehicle 10.

As shown, in transitioning between these two positions, arm member 20 attached to wheelchair 5 both rotates outwardly toward the rear of vehicle 10 and translates rearwardly toward the rear of vehicle 10 until it is in the position illustrated in FIG. 6, where wheelchair 5 is prepared to be received and engaged by storage platform 35. In some alternative embodiments, aria member 20 may translate rearwardly completely before rotating or vice versa, depending on the vehicle for which storage device 1 will be used.

Control panel 30 preferably is in communication with a computer device for controlling operation of motors 75, 80, 100. The relative position of arm member 20 may be determined by software that is pre-programmed into the computer device. So that device 1 may be used with any make or model of vehicle, the software may have different instructions and preprogrammed points at which different motors may be activated to initiate movements of arm 20 in particular directions in order to prevent wheelchair from 5 to crashing into the wheelchair user's vehicle or an adjacent vehicle, and to ensure that wheelchair 5 is substantially aligned with storage platform 35 when it is rotated to the position ready to be received by storage platform 35 behind vehicle 10.

The computer device may also include a wireless or wired connection and a control board and controller so that a remote control may be used to activate motors 75, 80, 100 and begin the process of stowing wheelchair 5. Drivers for motors 75, 80, 100 are preferably in electronic communication with a vehicle's power supply, such that power for controlling motors 75, 80, 100 is provided by the vehicle's battery, either directly or indirectly. A connection to the vehicle's battery may be made via the vehicle's trunk or through an alternative electrical pathway. In other embodiments, a separate power source such as a battery unit could be provided to power device 1. In at least one embodiment, sensors may further be used to determine the position of wheelchair 5 and relay information to the controller to regulate the speed of motors 75, 80, and/or 100 based on the position of wheelchair 5.

FIG. 8 illustrates storage platform 35 of wheelchair storage device 1 before receiving and securing wheelchair 5. Storage platform 35 may be affixed to the rear of vehicle 20 via a trailer hitch (not illustrated) or otherwise mounted to vehicle 20 in a manner known and understood in the art, for example using bracketing. Various forms and configurations are available for storage platform 35 to decrease wind resistance, improve travel, etc., and the illustrated embodiment is an exemplar only. In at least one embodiment, the trailer hitch may be able to hinge open such that a trunk area of vehicle 10 is accessible. Lights such as reverse or brake lights may also be added to storage platform 35 and/or an associated trailer hitch for safety purposes in a manner known and understood in the art.

Figure 9:
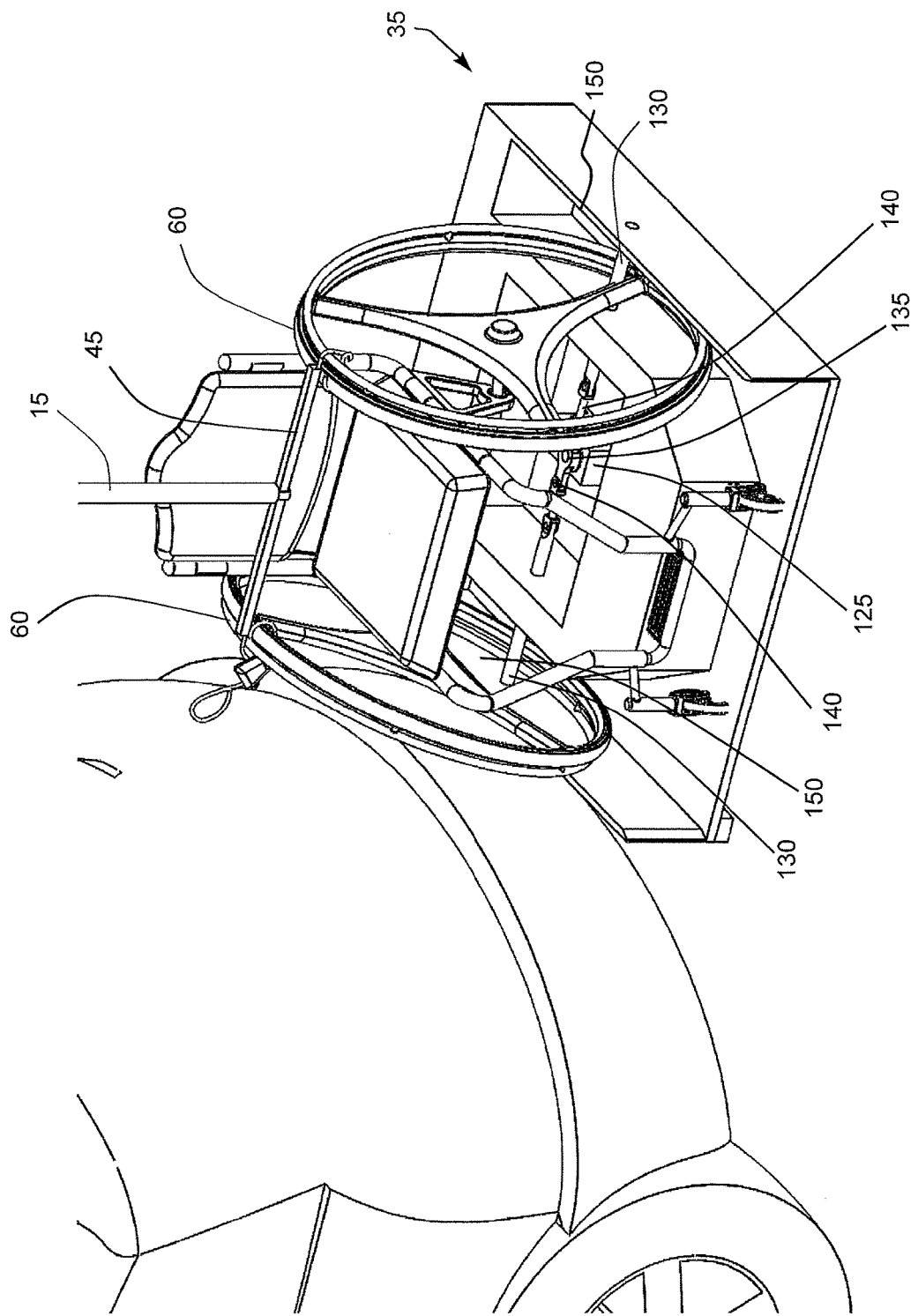
FIG. 9 is a perspective view of the storage platform of FIG. 9, wherein the lock mechanism associated with the storage platform has received and secure the wheelchair.

As shown in FIG. 8, storage platform 35 includes wheel receivers 115 for receiving wheels 60 of wheelchair 5 in the manner shown in FIG. 9 and described hereinbelow. When arm member 20 has been rotated such that it is substantially behind vehicle 20, wheelchair 5 may also be rotated such that its wheels 60 are in substantial alignment with wheel receivers 115. As arm member 20 continues to rotate, wheels 60 are preferably guided into receivers 115, as shown in FIGS. 9 and 10.

In alternative embodiments, storage platform 35 may be a box-like storage device to protect wheelchair 5 from weather damage or other elements. It also could further include a cover to protect wheelchair 5 from various potentially damaging elements. In the aforementioned embodiments, such a storage platform may still be automatically controlled, including any associated cover.

A locking device 120 may also be provided in storage platform 35 for locking wheelchair 5 to the rear of vehicle 10 after its wheels are received by wheel receivers 115. In a preferred embodiment, locking device 120 is motorized, but in alternative embodiments may be manually operated. In the embodiment where locking device 120 is motorized, it may be in electronic communication with the computer device associated with the gears and motors of control panel 30 and a power supply of the vehicle, preferably the car battery. When the computer device instructs locking device 120 to activate, a motor (not illustrated) within housing 125 of locking device 120 may initiate the rotation of locking cylinders 130 by way of rotating pivot 135 and pivot arms 140.

When pivot 135 is rotated, so too are pivot arms 140 and locking cylinders 130. Apertures 145 are provided in storage platform 35 for each locking cylinder 130 to pass through before locking wheels 60. After locking cylinders 130 pass through apertures 145, they pass through spokes of wheels 60 and abut an interior portion 150 of storage platform 35, as shown in FIG. 9. With locking cylinders 130 in place within wheels 60, wheelchair 5 is secured at its lower end by locking device 120 and secured at its upper end by attachment member 40. When vehicle 10 is in motion, wheelchair 5 is therefore preferably stabilized such that it will not fall off of vehicle 10, as shown in FIG. 1.

When a wheelchair user reaches his or her destination, the reverse process substantially similar to that described above may take place to return wheelchair 5 to the side of vehicle 10 so that the wheelchair user may get back into wheelchair 5.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. Thus, there has been shown and described several embodiments of a novel invention securing a wheelchair for a wheelchair user while the wheelchair user is in transit. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A wheelchair storage device for securing and storing a wheelchair at a rear portion of a vehicle, the storage device comprising:
  an adapter plate selectively attachable to a roof rack of the vehicle, the adapter plate including a track member extending along the length of the adapter plate;
  a control panel attached to said adapter plate;
  an arm member attached to said control panel, said arm member including both of a horizontal arm portion and a vertical arm portion;

an attachment member attached to a lower portion of said vertical arm portion for selectively engaging said wheelchair;

a first motor housed in said control panel for operating said vertical arm portion;

a second motor housed in said control panel, said second motor including a gear assembly connected to said horizontal arm;

a third motor housed in said control panel, said third motor including a gear assembly engaged with said track member;

wherein when said attachment member is selectively engaged with said wheelchair and said first motor is activated, said vertical arm portion is pulled upwardly and said wheelchair is lifted off of a ground surface; and wherein when said second motor is activated, said horizontal arm portion and said wheelchair are rotated rearwardly toward said rear portion of said vehicle; and wherein when said third motor is activated, said horizontal member and said wheelchair are translated rearwardly toward said rear portion of said vehicle.

2. The wheelchair storage device of claim 1, wherein the storage device includes a storage platform for stowing the wheelchair when the vehicle is in motion.

3. The wheelchair storage device of claim 2, wherein the storage platform includes a locking device for securing the wheelchair within the storage platform while the vehicle is in motion.

4. The wheelchair storage device of claim 1, wherein the wheelchair storage device is in communication with a power source of the vehicle for providing power to the wheelchair storage device.

5. The wheelchair storage device of claim 1, wherein the control panel includes a computer device having software for programming operations of the wheelchair storage device.

6. The wheelchair storage device of claim 1, wherein the attachment member includes hook members for receiving and securing wheels of the wheelchair.

7. The wheelchair storage device of claim 1, wherein the vertical arm portion is telescoping.

8. The wheelchair storage device of claim 1, wherein a cord member is provided through the first arm portion and the second arm portion in connection at a first end with the attachment mechanism and at a second end with the first motor such that when the first motor is activated the wheelchair is lifted vertically upwards.

9. The wheelchair storage device of claim 1, wherein the adapter plate may be selectively engageable with a rack member of any type of vehicle.

10. The wheelchair storage device of claim 1, wherein the first, second, and third motors are operable using a remote control.

11. A wheelchair storage device for securing and storing a wheelchair at a rear portion of a vehicle, the storage device comprising:

an adapter plate selectively attachable to a roof rack of the vehicle, the adapter plate including a track member extending along the length of the adapter plate;

a control panel attached to said adapter plate;

an arm member attached to said control panel, said arm member including both of a horizontal arm portion and a vertical arm portion;

an attachment member attached to a lower portion of said vertical arm portion for selectively engaging said wheelchair;

a first motor housed in said control panel, said first motor operable to move said vertical arm portion;

a second motor housed in said control panel, said second motor including a gear assembly connected to said horizontal arm;

a third motor housed in said control panel, said third motor including a gear assembly engaged with said track member;

a storage platform affixed to said rear portion of said vehicle for storing said wheelchair while said vehicle is in motion;

wherein when said attachment member is selectively engaged with said wheelchair and said first motor is activated, said vertical arm portion is pulled upwardly and said wheelchair is lifted off of a ground surface; and wherein when said second motor is activated, said horizontal arm portion and said wheelchair are rotated rearwardly toward said rear portion of said vehicle; and wherein when said third motor is activated, said horizontal member and said wheelchair are translated rearwardly toward said storage platform at said rear portion of said vehicle.

12. The wheelchair storage device of claim 11, wherein the storage platform includes a locking device for securing the wheelchair within the storage platform while the vehicle is in motion.

13. The wheelchair storage device of claim 11, wherein the wheelchair storage device is in communication with a power source of the vehicle for providing power to the wheelchair storage device.

14. The wheelchair storage device of claim 11, wherein the control panel includes a computer device having software for programming operations of the wheelchair storage device.

15. The wheelchair storage device of claim 11, wherein the attachment member includes hook members for receiving and securing wheels of the wheelchair.

16. The wheelchair storage device of claim 11, wherein the vertical arm portion is telescoping.

17. The wheelchair storage device of claim 11, wherein a cord member is provided through the first arm portion and the second arm portion in connection at a first end with the attachment mechanism and at a second end with the first motor such that when the first motor is activated the wheelchair is lifted vertically upwards.

18. The wheelchair storage device of claim 11, wherein the adapter plate may be selectively engageable with a rack member of any type of vehicle.

19. The wheelchair storage device of claim 11, wherein the first, second, and third motors are operable using a remote control.

20. The wheelchair storage device of claim 11, wherein the storage platform is affixed to the rear portion of the vehicle via a trailer hitch attachment.

* * * * *

UNITED STATES PATENT AND TRADEMARK OFFICE
CERTIFICATE OF CORRECTION

PATENT NO.        : 9,937,088 B2
APPLICATION NO.   : 15/142716
DATED             : April 10, 2018
INVENTOR(S)       : Charlotte Guertler et al.

It is certified that error appears in the above-identified patent and that said Letters Patent is hereby corrected as shown below:

In the Specification

Column 6, Line 63, delete "aria" and replace with -- arm --

Signed and Sealed this
Twenty-sixth Day of June, 2018

Andrei Iancu
*Director of the United States Patent and Trademark Office*